United States Patent

Chabot, Jr. et al.

Patent Number: 5,409,332
Date of Patent: Apr. 25, 1995

[54] UNIVERSAL JOINT

[76] Inventors: Bertin R. Chabot, Jr., 134 Ramona Rd., Portola Valley, Calif. 94028; Lawrence D. Knapp, 3835 W. Rincon Ave., Campbell, Calif. 95008

[21] Appl. No.: 771,315
[22] Filed: Oct. 2, 1991
[51] Int. Cl.⁶ .............................................. F16C 11/06
[52] U.S. Cl. ...................................... 403/114; 403/57; 403/74; 403/122; 81/177.75
[58] Field of Search .................. 403/116, 114, 57, 74, 403/112, 113, 122; 464/152, 151, 141, 139, 125, 112, 906; 81/177.75, 177.7; 285/264, 265

[56] References Cited

U.S. PATENT DOCUMENTS

| | | | |
|---|---|---|---|
| 255,103 | 3/1882 | Deschamps | 464/141 X |
| 1,021,924 | 4/1912 | Fetzer | 285/264 X |
| 1,418,380 | 6/1922 | Keck | 464/125 |
| 3,107,505 | 10/1963 | Koss | 464/141 |
| 3,587,249 | 6/1971 | Arnold | 464/151 |
| 4,636,180 | 1/1987 | Runkle | 403/116 X |
| 4,804,220 | 2/1989 | Rosheim | 403/74 X |
| 4,936,701 | 6/1990 | Allen et al. | 403/114 X |

FOREIGN PATENT DOCUMENTS

| | | | |
|---|---|---|---|
| 0173012 | 3/1986 | European Pat. Off. | 464/112 |
| 573631 | 9/1977 | U.S.S.R. | 464/141 |

Primary Examiner—Dave W. Arola
Assistant Examiner—Harry C. Kim

[57] ABSTRACT

A universal joint including a ball and a ball socket. The ball includes a drive socket for connection to a driving or driver shaft. The drive socket is located substantially totally within the ball socket.

26 Claims, 2 Drawing Sheets

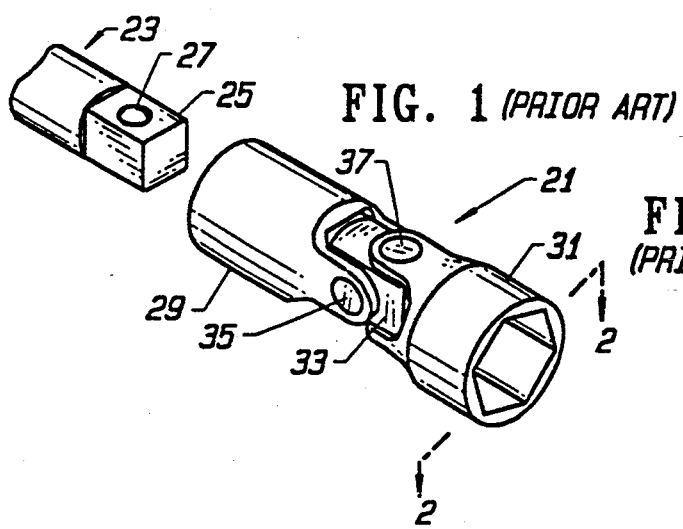
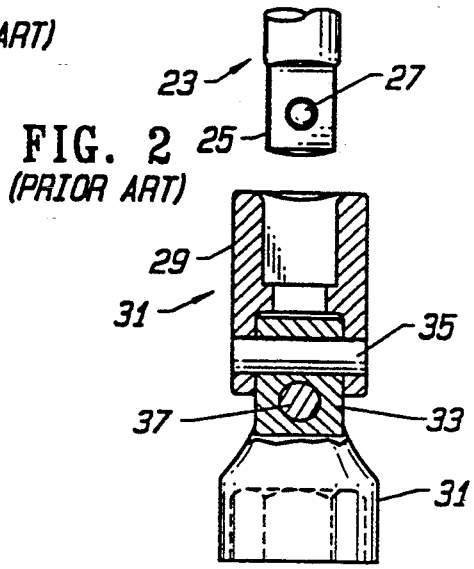
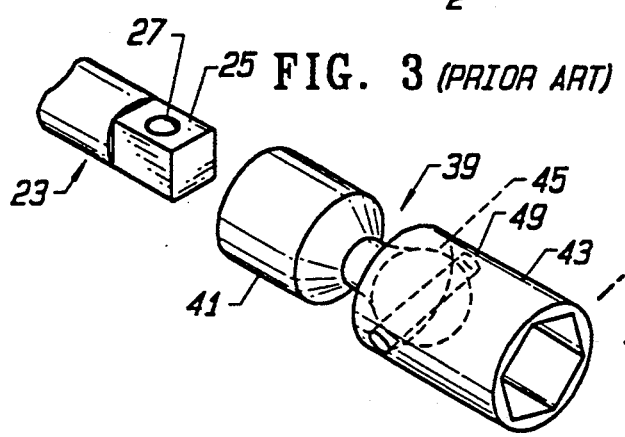
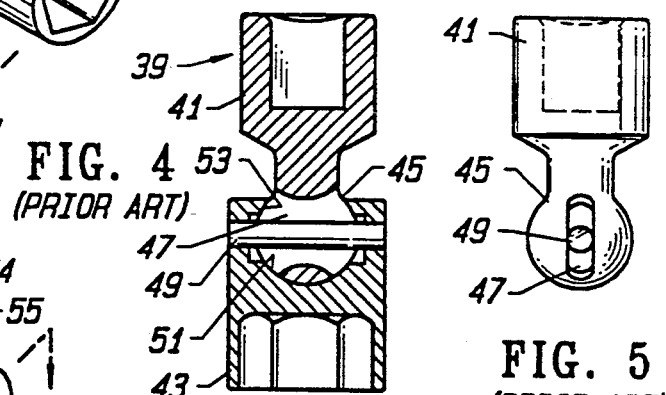
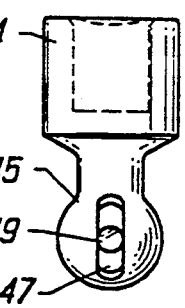
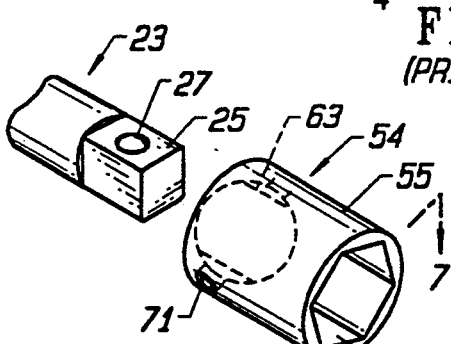
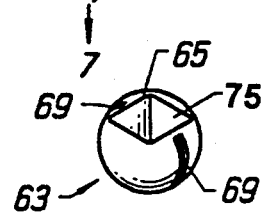
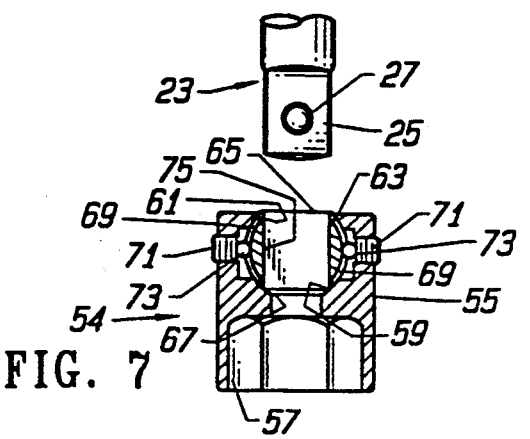

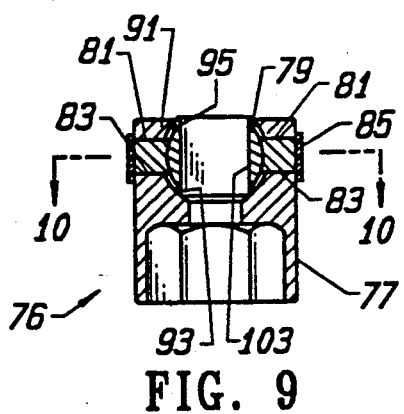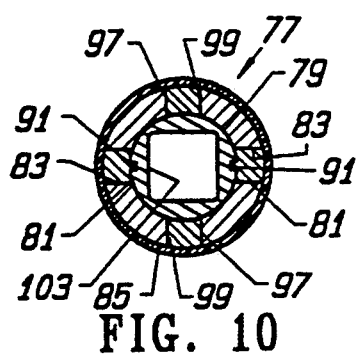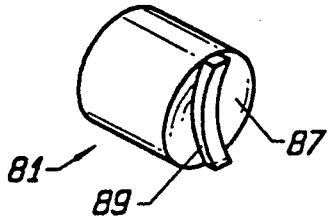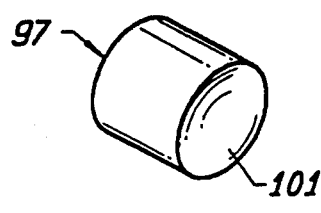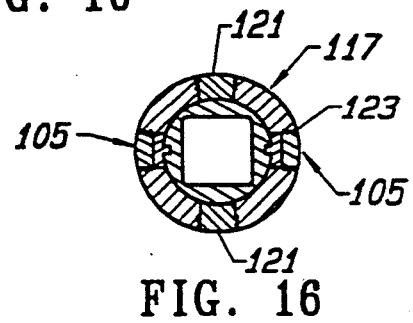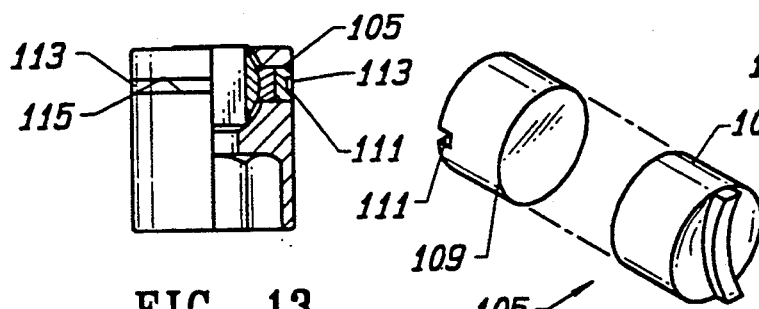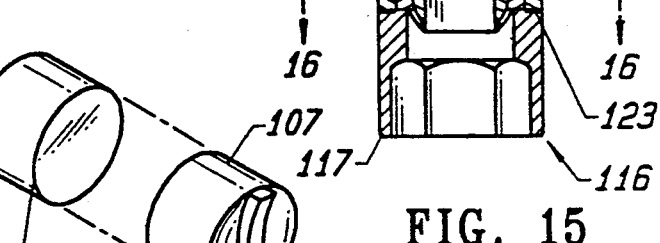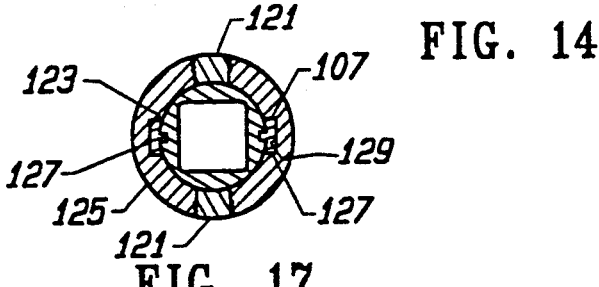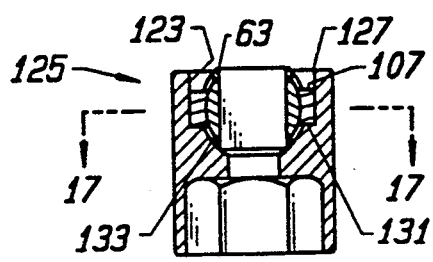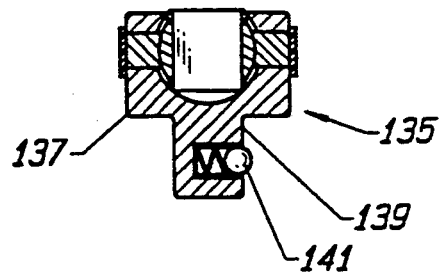

UNIVERSAL JOINT

The present invention relates to universal joints in general, but especially to such joints for use with hand tools such as socket wrenches and which serve to permit such wrenches to be driven about an axis in nonalignment with the driving force.

Universal joints of the above nature have been in use for some time and at the present time take several forms. Perhaps the most commonly used universal joint employed in tools is one in which the two ends of the joint are each connected to a central stem by means of individual pivot pins which are arranged at 90° with each other. Another popular form of tool universal joint includes a ball and socket arrangement wherein the ball is pierced almost entirely through by a slot which receives a retaining pin. Still other universal joints have been proposed are such as shown in Adams U.S. Pat. No. 2,526,105 including a ball and socket arrangement wherein the ball remains solid except for four circumferential grooves on the periphery of the ball for cooperation with four pins to provide the driving force. Both the ball and the socket portion include extensions to receive either a socket or a driving element.

While several of these various universal joints have been used in the past, they all suffer from the fact that the joints are relatively long. In addition, the joints are frequently unstable particularly when the axis of the driving means is at a substantial angle from the axis of the driven device such that, in the case of a socket wrench operation, the socket may slip from the driven nut or bolt thereby subjecting the user to some form of injury. Thus, it is frequently necessary in using universal joints of the prior art to use one hand to provide the driving force and to use the other hand to guide and steady the joint. Indeed, U.S. Pat. No. 4,936,701 to Allen et al teaches the use of a guide sleeve for a universal socket for just such purposes.

SUMMARY OF THE INVENTION

The present invention provides a universal joint of the type employing a ball and socket arrangement but, unlike the prior art, places one end of the coupling and specifically a female end within the ball itself. With such an arrangement, the overall length of the joint is shortened thereby providing more steady operation, particularly when the axes of the joint ends are at a substantial angle from each other. In addition, the invention permits the joint to be used within tighter confines.

BRIEF DESCRIPTION OF THE DRAWING

FIG. 1 is a perspective view of a prior art universal joint employing a central stem joined to each of the socket portions by means of pins having their axes arranged at 90° with respect to each other.

FIG. 2 is a cross sectional view of the prior art joint shown in FIG. 1 taken along the lines 2—2 of FIG. 1.

FIG. 3 is a perspective view of another prior art joint, this one employing a ball and socket combination interconnecting the two ends.

FIG. 4 is a sectional view taken along the line 4—4 of the prior art joint shown in FIG. 4.

FIG. 5 is a side elevational view of the ball portion of the prior art joint shown in FIGS. 3 and 4.

FIG. 6 is a perspective view of a first embodiment of universal joint in accordance with the invention.

FIG. 7 is a cross sectional view of the joint shown in FIG. 6 taken along the line 7—7 of FIG. 6.

FIG. 8 is a perspective view of the ball employed in the joint shown in FIGS. 6 and 7.

FIG. 9 is a cross sectional view of a second embodiment of universal joint in accordance with the invention showing the ball retained by keys engaged in slots within the ball itself.

FIG. 10 is a cross sectional view of the joint shown in FIG. 9 taken along the line 10—10 of FIG. 9.

FIG. 11 is a perspective view of the key used in the joint shown in FIG. 9.

FIG. 12 is a perspective view of a support cup which may be used in the joint shown in FIG. 9.

FIG. 13 is an elevational view, partly in section, of another embodiment of universal joint in accordance with the invention wherein the joint employs a ball retained by two part keys engaged in slots within the ball.

FIG. 14 is a perspective exploded view of a two part key used in the embodiment of FIG. 13.

FIG. 15 is a cross sectional view of still another embodiment of the universal joint in accordance with the invention, this showing a joint wherein the ball is retained within the coupling solely by means of keys and a pair of keepers.

FIG. 16 is a sectional view taken along the line 16—16 of FIG. 15.

FIG. 17 is a cross sectional view of another embodiment of the universal joint in accordance with the invention, this showing a joint wherein the keys are retained by the side walls of the joint body itself.

FIG. 18 is a sectional view taken along the line 18—18 of FIG. 17.

FIG. 19 is a sectional view of an embodiment of the invention wherein the total portion of the universal joint is a drive shaft.

THE PRIOR ART

One example of the prior art universal joints is shown in FIGS. 1 and 2 wherein a universal joint 21 is adapted to fit onto a tool drive shaft 23 which includes a square drive portion 25 and a spring loaded detent ball 27. The joint 21 includes a driving socket portion 29 incorporating a square drive socket (not shown) to cooperate with the square drive 25 of the shaft 23. The joint 21 also includes a wrench socket 31. The driving socket 29 and the wrench socket 31 are interconnected by means of a stud 33 and pivot pins 35 and 37 arranged on the stud 33 at 90° angles from each other. As can be recognized, drive shaft 23 may deliver rotary motion to the wrench socket 31 not only when the shaft 13 and the wrench 21 are coaxial with each other but also when their axes are at an angle from each other.

It should also be recognized, however, that the universal joint 21 is relatively long in that the wrench socket 31 is arranged substantially in tandem with the driving socket portion 29, the stud 33 being interposed between the two.

Referring now to FIGS. 3, 4 and 5 still another prior art universal joint is shown which cooperates with the same type of drive shaft 23 as used in conjunction with the joint shown in FIGS. 1 and 2. Universal joint 39 of FIGS. 3, 4 and 5, includes a square drive socket 41 adapted to receive the drive shaft 23 and a wrench socket 43. The socket 41 includes a ball portion 45 which includes a slot like pocket 47 extending all the way across the ball for a major portion of its diameter.

The pocket 47 is adapted to receive a retaining pin 49 which is conventionally retained within the body of the wrench socket 43. Pin 49 has a right circular cylindrical shaft thereby permitting the ball to swivel about the axis of the pin. The pocket 47 has sufficient area to permit the ball to swivel left and right as viewed in FIG. 4. Thus the ball has two dimensional rotation within the wrench socket 43. The wrench socket 43 also includes a spherical seat 51 and a spherically contoured annular shoulder 53 which can be swaged or otherwise turned onto the ball after assembly.

Again, it should be recognized that the universal joint 39, similar to the joint 21 shown in FIGS. 1 and 2, is relatively long. A commercially available universal joint of the type shown in FIG. 1, specifically a ⅜ inch square drive 17 mm. hex wrench, has an overall length of 54 mm. A joint of the type shown in FIG. 1, having the same size and available from the same manufacturer has the overall length of 63 mm. As will be noted hereinafter, these lengths are at least twice the length of a joint of the same size in accordance with the invention herein. The invention is described herein principally in relation to a universal joint as used with tools. However, it should be understood that the invention may well also be used whenever flexible rotating joints are required such as a substitute for the constant velocity joints used, or flexible joints used, with automotive drive shafts, half shafts or steering shafts, or in robotic devices.

DETAILED DESCRIPTION OF THE INVENTION

Referring now to FIGS. 6 and 7, there is shown a first embodiment of the invention. A joint 54 is adapted to cooperate with a drive shaft 23 such as that used in conjunction with the prior art universal joints shown in FIGS. 1 and 3. The universal joint 54 includes a generally cylindrical body 55 having a tool in the form of a hexagonal wrench socket 57 at one end thereof and a spherical seat portion 59 and a spherically contoured annular shoulder 61 at the other end thereof. Contained between the seat 59 and shoulder 61 is a spherically shaped ball 63 having truncated ends 65 and 67 and a pair of circumferentially arranged slots 69. The details of the ball 63 can best be seen in the perspective view of FIG. 8. A pair of set screws 71 threaded through the wall of the cylindrical body 55 extend into the slots 69. Finally the ball 63 includes a square drive socket opening 75 to accommodate the square drive portion 25 of another tool such as the drive shaft 23. The slots 69 are arranged on a circumference which passes through the axis of the socket opening 75 and, in order to retain the greatest mass and strength of the ball 63, are preferably located along the center of the flats of that opening.

Thus, it may be seen that a joint, as shown in FIGS. 6, 7 and 8, includes a ball which may rotate about the axes of the set screws, or pins, 71. Instead of the pins 71 seating directly in the slots 69, pins 71 may include a concavity at their ends thereby capturing balls 73 in the slots 69 so as to provide reduced friction against the rotation of the ball. Thus, it can be seen that the universal joint, as shown in FIGS. 6, 7 and 8, is relatively short by reason of the fact that the square drive socket opening 75 is within the ball itself rather than in an extension of the ball as in the prior art illustrated in FIGS. 3, 4 and 5.

Referring to FIGS. 9, 10, 11 and 12 a second embodiment of the invention is shown similar to that shown in FIGS. 6, 7 and 8. The joint 76 also includes a generally cylindrical body 77 and a drive ball 79. The ball 79 is retained in the body 77 by means of keys 81 rotatably held in cylindrical openings 83 and retained in position by means of a relatively rigid ring, or band, 85 formed of material having sufficient strength to hold the keys against the forces of the wrench. One such material has been found to be a plastic marketed under the trade name Delrin by E. I. DuPont. Alternatively, the band 85 may be formed of metal or any other material having sufficient strength to maintain the keys in position. As can be seen particularly in FIG. 11 the key 81 includes a spherically concave surface 87 corresponding to the spherical surface of the ball 79. The key also includes a concavely contoured rib 89 which conforms to the slots 91 in the ball 79. Thus the ball is permitted to rotate about one axis by a sliding interconnection between the ribs 89 and the slots 91 and about a perpendicular axis by means of rotation of the keys 81 in the openings 83.

While the joint 76 is shown in FIG. 9 as including a lower spherical seat portion 93, as well as an upper spherical seat portion 95 to retain the ball 79 in position (the upper seat 95 may be formed by swaging the upper portion of the joint 76 after assembly of parts), additional support for the ball 79 within the joint 76 may be obtained by the use of keepers 97 retained within openings 99 in the body 77. As seen in FIG. 12 the keeper includes a spherically concave surface 101. While the keeper is shown as having a round cross section so as to permit rotation within the opening 99 such rotation is not necessary and the keeper may, if desired, have a square or other cross section.

Again, the universal joint as shown in FIGS. 9 through 12 is relatively short because the square drive socket opening 103 is located within the confines of the ball itself rather than in an extension of the ball.

Referring now to FIGS. 13 and 14 still another embodiment of the invention is shown being identical in all respects to that of FIGS. 9 through 12 with the exception of the formation of the key 105 which, in this instance, is in two parts including a shortened key element 107 and a retainer element 109. The cooperation of the key portions 107 with their associated slots in the ball is the same as set forth above with respect to FIGS. 9 and 10. The retainer element 109 includes a slot 111 which may cooperate with a band 113 which is preferably in the form of a split metal retainer ring formed of spring steel or the like. If desired the body of the joint may define a circumferential groove in alignment with the slots 111 so that the ring 113 may be flush with the overall body. Rather than the usual split spring retainer ring the ring 113 may, of course, be formed as a continuous ring which is force fit over the body of the joint to fit into the groove 115.

Referring to FIGS. 15 and 16 still another embodiment of the invention is shown similar to the preceding described two embodiments. However, in joint 116, the body 117 provides no spherical seat for the ball 119. Rather, the ball is held in place totally by the use of the keys 105 and keepers 121. Keys 105 may, if desired, include a threaded retainer portion and, similarly, the keepers 121 may be threaded so as to provide optimal frictional engagement with the ball 119. Alternatively, the keepers 121 and keys 105 may be retained by the use of a retainer ring and slots such as the ring 113 slots 111 shown in FIGS. 13 and 14.

Referring now to FIGS. 17 and 18, there is shown an embodiment of the invention wherein the keys are retained in position by the walls 123 of the body 125 itself. The body 125 includes diametrically opposed slots 127. During assembly, key elements 107 are positioned in the slots 69 of the ball 73 and, as so assembled, are placed into the slots 127. The ball 63 is then held in position within the body 125 by keepers such as the threaded keepers 121. The slots 127 are formed with flat back walls 129 and semicircular bottom walls 131 so as to facilitate rotation of the key elements 107 therein. The position of the ball 63 within the body 125 may be maintained solely by the spherically concave keepers 121; or alternatively, additional support may be provided by a spherically shaped seat 133 formed in the body itself. A seat 133 may be especially desirable when the joint is used with a pneumatic nut driver.

Referring to FIG. 19 another embodiment is shown substantially identical to that shown in FIG. 9. However, the joint 135 of FIG. 17 includes a body 137 having a drive shaft 139 and a spring loaded ball detent 131 as the tool end rather than the wrench socket of FIG. 9.

Thus there has been described several embodiments of universal joint in accordance with the invention all of which provide a joint of substantially shorter length than those of the prior art. Moreover, the joints described permit substantial angular divergence between the input and output axes. In comparison with the prior art universal joints described with respect to FIGS. 1 through 5, a similar size ⅜ inch, square drive 17 mm. wrench has been made in accordance with the embodiment shown in FIGS. 9 and 10 (but without the use of keepers 97) and the overall length is merely 27 mm. Clearly the shortened length of the joint compared with the prior art provides considerable advantages not only in adding to the stability of the joint while in use but also in permitting the joint to be used in very tight confines.

While the invention has been described in relative to wrenches, it should be recognized that it may be used advantageously whenever a flexible rotating joint is required such, for instance, as with other rotary tools, automotive drive shafts, steering shafts and robotic devices. Such tools may include, for instance, taps, dies, routers and drills. Moreover, the ball could equally well serve as the driven portion of the joint and the body could serve as the driving portion.

What is claimed is:

1. A universal joint comprising:
   at least two portions including a rotatable driving portion and a rotatable driven portion,
   a ball receiving recess in one of said portions, the other of said portions including a ball having a generally spherical surface, said ball being disposed substantially totally within said ball receiving recess, and
   drive means connecting said driving portion to said driven portion for providing torsional load transmission between said driving portion and said driven portion, said drive means including at least one slot disposed at least partially circumferentially about said ball, and further including at least one generally cylindrically shaped drive key pivotally retained in said one of said portions, said drive key having a concave, ball mating surface at one end thereof and a raised rib extending above said concave surface, said raised rib slidably extending into said at least one slot, wherein a first axis of rotation for said ball is provided by said drive key pivoting about its longitudinal axis, and wherein a second axis of rotation, normal to said first axis of rotation, is provided by relative motion between mated surfaces of said ball and slot and said drive key.

2. A universal joint as defined in claim 1 wherein said ball includes a drive recess therein adapted to receive and engage a drive shaft.

3. A universal joint as defined in claim 1 wherein said one of said portions defines a concave seat and an annular rim having a concave surface for rotatably securing said ball.

4. A universal joint as defined in claim 1 further comprising a retaining band secured about said one of said portions, wherein said drive key extends through said one of said portions to an outside surface thereof, said retaining band overlying a portion of said drive key extending to the surface of said one of said portions and retaining said drive key therein.

5. A universal joint as defined in claim 4 wherein said retaining band is a spring retaining ring.

6. A universal joint as defined in claim 4 wherein said drive means further includes at least one retainer element, said retainer element extending to the outside surface of said one of said portions and including a second slot, said retaining band being in engagement with said second slot to thereby secure the retaining band in position on the surface of said one of said portions.

7. A universal joint as defined in claim 6 wherein said ball is retained within said one of said portions solely by said at least one drive key and said at least one keeper.

8. A universal joint as defined in claim 1 further comprising at least one keeper secured within said one of said portions, said keeper including a concave, ball mating surface in contact with said ball.

9. A universal joint as defined in claim 1 wherein said ball is retained within said one of said portions solely by said at least one drive key and said ball receiving recess.

10. A universal joint comprising:
    at least two portions including a rotatable driving portion and a rotatable driven portion,
    a ball receiving recess in one of said portions, the other of said portions including a ball having a generally spherical surface, said ball being disposed substantially totally within said ball receiving recess,
    at least one slot disposed at least partially circumferentially about said ball,
    at least one generally cylindrically shaped drive key pivotally retained in said one of said portions, said drive key having a concave, ball mating surface at one end thereof and a raised rib extending above said concave surface, said raised rib slidably extending into said at least one slot,
    said ball being rotatable about a first axis of rotation by said drive key pivoting about its longitudinal axis, and being rotatable about a second axis of rotation, normal to said first axis of rotation, by relative motion between mated surfaces of said ball and said drive key.

11. A universal joint as defined in claim 10 wherein said ball includes a drive recess therein adapted to receive and engage a drive shaft.

12. A universal joint for use with universal socket tools comprising:
    a body member having a rotatable tool at one end thereof and a ball receiving recess at the opposite end thereof, a ball member having a generally spherical surface disposed substantially totally within said ball receiving recess, said ball member including a drive recess therein adapted to receive and engage a drive shaft of another tool, drive means for providing torsional load transmission between said ball member and said body member, and for providing a first and a second axis of rotation for said ball member, said second axis of rotation being normal to said first axis, and at least one keeper secured within said body member, said keeper including a concave surface in contact with said ball member.

13. A universal joint as defined in claim 12 wherein said rotatable tool comprises a socket.

14. A universal joint as defined in claim 12 wherein said rotatable tool comprises a drive shaft.

15. A universal joint as defined in claim 12 wherein said body member defines a concave seat and an annular rim having a concave surface for rotatably securing said ball member.

16. A universal joint as defined in claim 12, further including a retaining band secured about said body wherein said keeper extends through said body member to an outside surface thereof, said retaining band overlying a portion of said keeper extending to the outside surface of the body member and retaining said keeper therein.

17. A universal joint as defined in claim 16 wherein said retaining band is a spring retaining ring.

18. A universal joint for use with universal socket tools comprising:

a body member having a rotatable tool at one end thereof and a ball receiving recess at the opposite end thereof, a ball member having a generally spherical surface disposed substantially totally within said ball receiving recess, said ball member including a drive recess therein adapted to receive and engage a drive shaft of another tool, and drive means for providing torsional load transmission between said ball member and said body member, and for providing a first and a second axis of rotation for said ball member, said second axis of rotation being normal to said first axis, wherein said drive means includes at least one slot disposed at least partially circumferentially about said ball member, and further includes at least one cylindrically shaped drive key pivotally retained in said body member, said drive key having a concave, ball mating surface at one end thereof and a raised rib extending above said concave surface, said raised rib slidably extending into said at least one slot, wherein said first axis of rotation is provided by said drive key pivoting about its longitudinal axis, and wherein said second axis of rotation is provided by relative motion between mated surfaces of said ball member and said drive key.

19. A universal joint for use with universal socket tools comprising:

a body member having a rotatable tool at one end thereof and a ball receiving recess at the opposite end thereof, a ball member having a generally spherical surface disposed substantially totally within said ball receiving recess, said ball member including a drive recess therein adapted to receive and engage a drive shaft of another tool, drive means for providing torsional load transmission between said ball member and said body member, and for providing a first and a second axis of rotation for said ball member, said second axis of rotation being normal to said first axis, said drive means including at least one drive key having a concave surface in contact with said ball member, and a retaining band secured about said body member, wherein said drive key extends through said body member to an outside surface thereof, said retaining band overlying a portion of said drive key extending to the outside surface of the body member and retaining said drive key therein, wherein said drive means further includes at least one retainer element, said retainer element extending to the outside surface of said body member and including a second slot, said retaining band being in engagement with said second slot to thereby secure the retaining band in position on the surface of said body member.

20. A universal socket tool comprising:

universal socket means for installing and removing threaded fasteners, said universal socket means including:

a body member having a rotatable member at one end thereof and a ball receiving recess at the opposite end thereof, a ball member having a generally spherical surface disposed substantially totally within said ball receiving recess, said ball member including a drive recess therein adapted to receive and engage a drive shaft of another tool, and drive means for providing torsional load transmission between said ball member and said body member, and for providing a first and a second axis of rotation for said ball member, said second axis of rotation being normal to said first axis.

21. A universal socket tool as defined in claim 20 wherein said drive means includes at least one slot disposed at least partially circumferentially about said ball member, and further includes at least one generally cylindrically shaped drive key pivotally retained in said body member, said drive key having a concave, ball mating surface at one end thereof and a raised rib extending above said concave surface, said raised rib slidably extending into said at least one slot, wherein said first axis of rotation is provided by said drive key pivoting about its longitudinal axis, and wherein said second axis of rotation is provided by relative motion between mated surfaces of said ball member and said drive key.

22. A universal joint comprising:

a ball; and a first member having a seat for the ball, said seat and said ball being slidable relative to each other, one of said seat and said ball having a first surface with at least one elongated slot thereon, the other of said seat and said ball including at least one cylindrically shaped drive key rotatably mounted therein, said drive key having a second surface engaging said first surface and having at least one elongated rib extending above said second surface, said rib being slidably received in the slot, said drive key being rotatable to permit the ball to rotate about a first axis normal to the plane of the slot and about a second axis normal to the first axis and passing through the drive key.

23. A universal joint as set forth in claim 22, wherein the slot is in the ball and the drive key is carried by the seat.

24. A universal joint as set forth in claim 22, wherein said seat has a keeper, said keeper having a cylindrical base rotatably mounted in the seat and projecting into a space to be occupied by the ball.

25. A universal joint as set forth in claim 24, wherein the keeper has an inner concave, ball mating surface, forming part of a ball-engaging surface of the seat.

26. A universal joint as defined in claim 22, wherein said ball includes a drive recess therein adapted to receive and engage a drive shaft.

* * * * *

UNITED STATES PATENT AND TRADEMARK OFFICE
CERTIFICATE OF CORRECTION

PATENT NO. : 5,409,332
DATED : April 25, 1995
INVENTOR(S) : Chabot, Jr. et al.

It is certified that error appears in the above-indentified patent and that said Letters Patent is hereby corrected as shown below:

In Column 6, Line 3 in Claim 1:
    replace "faces of said ball and slot and said drive key." with --faces of said ball and said drive key.--

In Column 7, Line 23, in Claim 14:
    replace "including a retaining band secured about said body" with --including a retaining band secured about said body member,--.

Signed and Sealed this

Nineteenth Day of December, 1995

Attest:

BRUCE LEHMAN

Attesting Officer      Commissioner of Patents and Trademarks